United States Patent [19]

Albrecht et al.

[11] 4,218,937

[45] Aug. 26, 1980

[54] MULTIPARTITE PEDAL OF PLASTIC MATERIAL FOR VEHICLES

[75] Inventors: Wilhelm Albrecht, Vaihingen-Enz; Bernd Riemer; Anton Allert, both of Stuttgart, all of Fed. Rep. of Germany

[73] Assignee: Daimler-Benz Aktiengesellschaft, Fed. Rep. of Germany

[21] Appl. No.: 918,501

[22] Filed: Jun. 23, 1978

[30] Foreign Application Priority Data

Jun. 25, 1977 [DE] Fed. Rep. of Germany ....... 2728787
Apr. 12, 1978 [DE] Fed. Rep. of Germany ....... 2815769

[51] Int. Cl.² .......................... G05G 1/14; F16C 11/00
[52] U.S. Cl. ........................................ 74/513; 74/560; 403/62; 403/220
[58] Field of Search .................. 74/512, 513, 560, 561; 403/291, 62, 220

[56] References Cited

U.S. PATENT DOCUMENTS

| | | | |
|---|---|---|---|
| 1,459,233 | 6/1923 | Moldenhauer | 74/513 |
| 2,712,359 | 7/1955 | Kramer | 74/560 |
| 3,151,498 | 10/1964 | Wilson et al. | 74/560 |
| 3,388,611 | 6/1968 | Clary et al. | 74/513 |
| 3,500,702 | 3/1970 | Roder et al. | 74/560 |
| 3,885,450 | 5/1975 | Tatum | 74/560 |

FOREIGN PATENT DOCUMENTS 416989 9/1934 United Kingdom ...................... 74/512

*Primary Examiner*—Kenneth Dorner
*Attorney, Agent, or Firm*—Craig & Antonelli

[57] ABSTRACT

A multipartite drive pedal of synthetic plastic material for vehicles whose members are hinge-like connected with each other by way of material-integrated film hinges, whereby within the area of the upper end of the foot plate of the drive pedal, a connecting member for the pivotal connection of the foot plate with a pivotal lever projecting into the leg space is arranged on the back side thereof; a bore which is provided in the connecting member for receiving the end of the lever facing the drive pedal is arranged in a clamping member pivotal relative to the connecting member within the same plane and coupled thereto by way of a film hinge; the bore is arranged transversely to the film hinges and the clamping member is adapted to be fixed axially on the at least approximately rectilinearly extending end of the lever in various positions to compensate for relatively large manufacturing tolerances.

13 Claims, 10 Drawing Figures

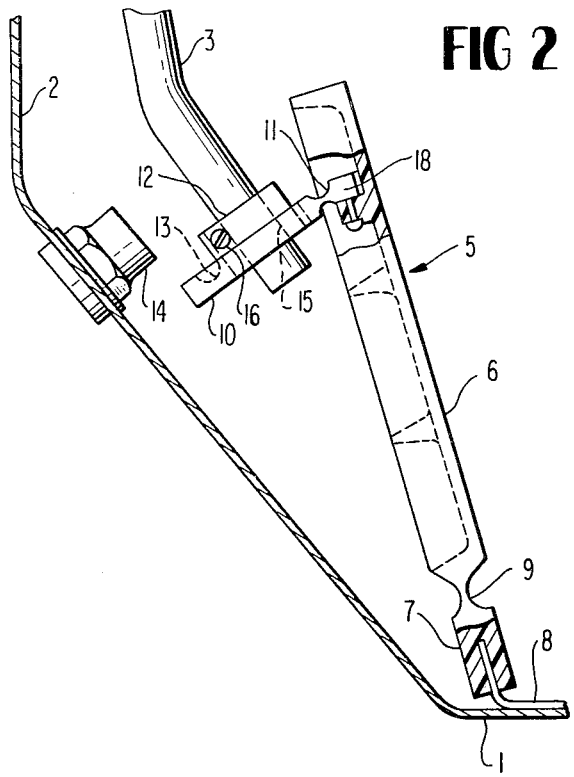
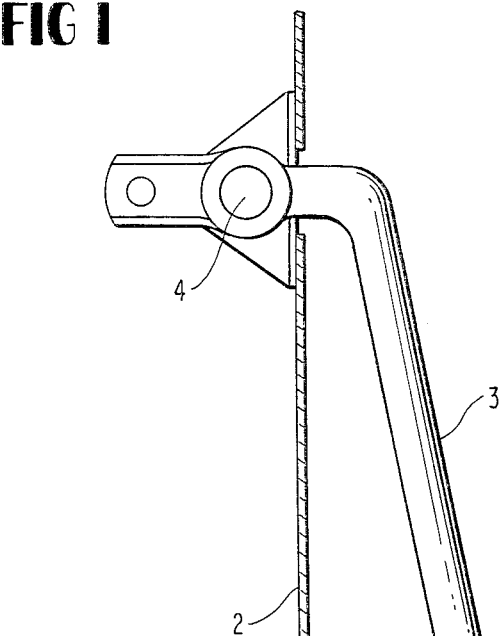
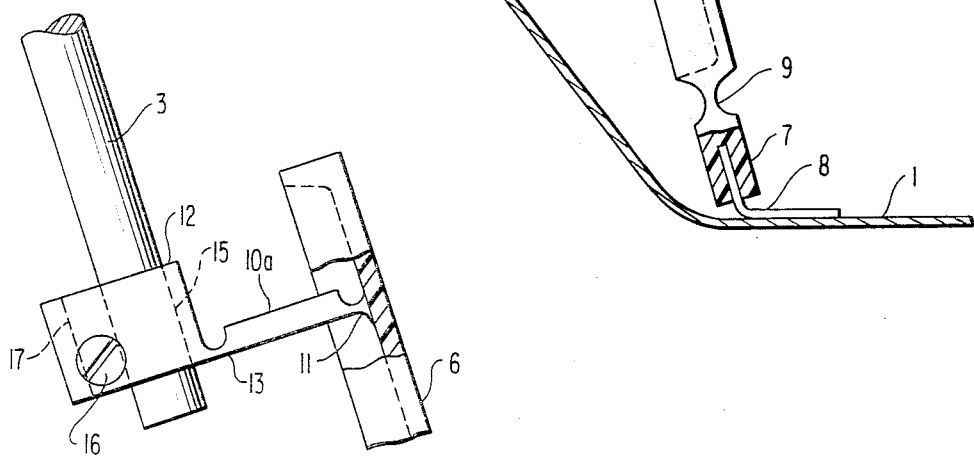

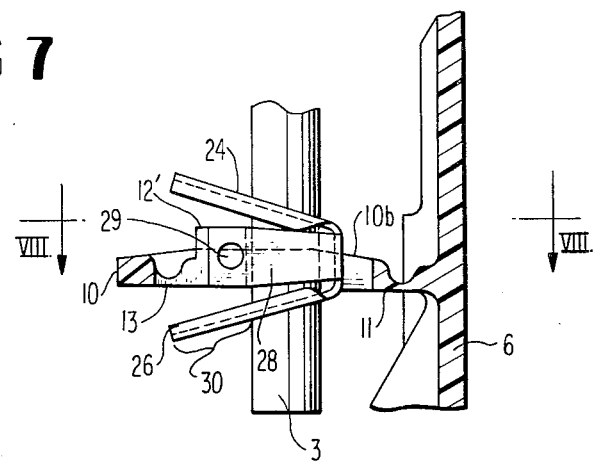
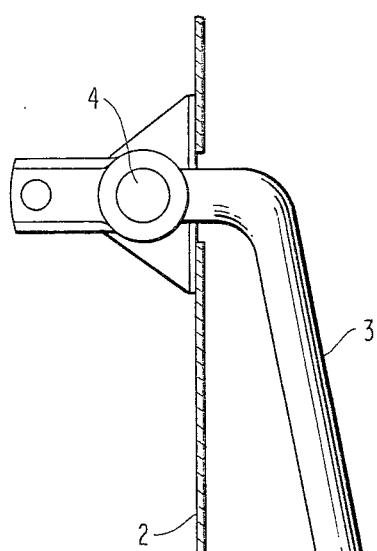
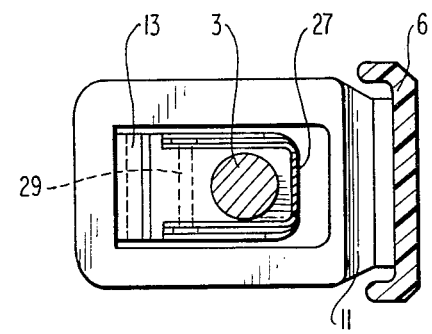
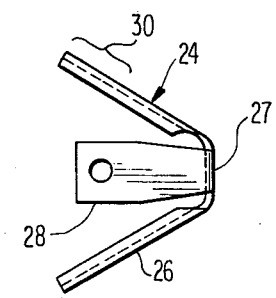
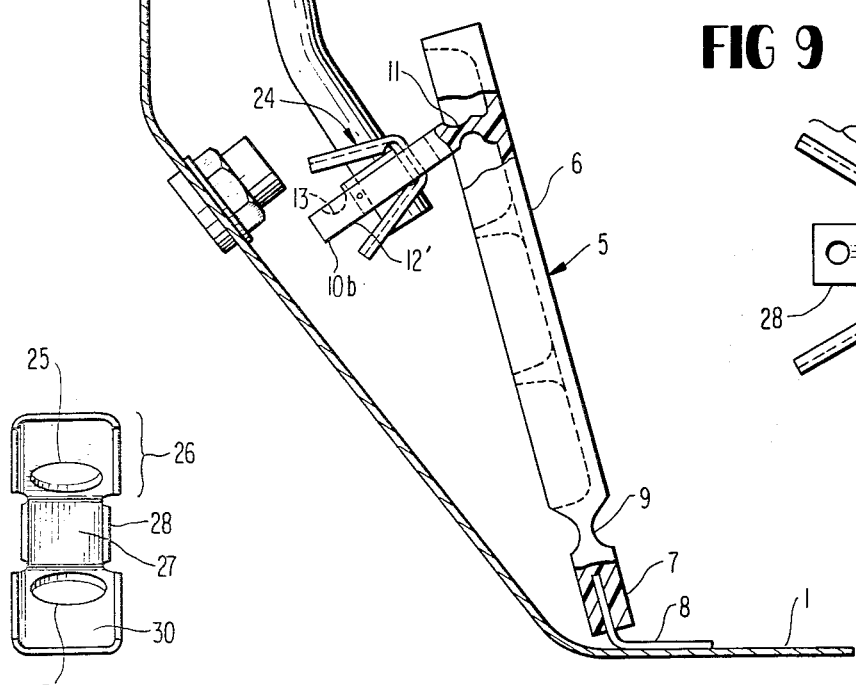

MULTIPARTITE PEDAL OF PLASTIC MATERIAL FOR VEHICLES

The present invention relates to a multipartite drive pedal of plastic material for vehicles, whose members are hinge-like connected with each other by way of material-integrated film hinges, whereby within the area of the upper end of the main member of the pedal—of the foot plate—, a connecting member is arranged on the back side thereof for the complete form-locking pivotal connection of the foot plate with a pivotal lever suspended into the leg space, and whereby a bore is provided in the connecting member for receiving the end of the lever facing the drive pedal.

Such a pedal is disclosed, for example, in the German Auslegeschrift No. 1,913,024. The intermediate member connected with the pedal foot plate by way of a film hinge represents a form-locking pivotal connection between the pivotal lever of the gas linkage hanging into the leg space and the pedal foot plate which is form-lockingly pivotal in both movement directions of the pedal. By reason of such a positive connection between the pedal and the lever of the gas linkage which is characterized by ease of motion, an excessive play, jamming, disengagement of the transmission linkage, rapid wear as well as squeak and rattle noises are avoided. In the prior art arrangement, the end of the lever constructed as round rod is cranked or offset at right angle in such a manner that the offset or cranked part comes to lie parallel to a hinge edge. A corresponding bore is provided in the intermediate member into which the cranked lever end is inserted. The bore and the cranked portion cooperate as hinge joint.

However, it is disadvantageous with this prior art arrangement that a compensation of larger manufacturing tolerances is not possible with such a connection of the intermediate member at the drive pedal and of the lever.

It is the aim of the present invention to so construct the positive movable connection between the drive pedal and the gas linkage that with a construction of the drive pedal that is favorable from a manufacturing point of view, also larger manufacturing tolerances can be compensated for without difficulties in the relative position between the drive pedal and the lever.

The underlying problems are solved according to the present invention in that the bore is arranged in a further member—a clamping member—that is pivotal in the same plane in relation to the connecting member and is connected therewith also by way of a film hinge, and in that the bore is disposed at right angle to the film hinges, whereby the clamping member is adapted to be axially fixed in different position on the at least approximately rectilinearly extending end of the lever.

Owing to the rectilinear construction of the end of the lever and owing to the additional pivotally coupled clamping member, a coupling between the lever and drive pedal in every desired longitudinal position can be established without difficulty by clamping action. As a result thereof, also larger manufacturing tolerances can be compensated for during the assembly. The pivotal connection between the lever and the drive pedal can operate in all installed cases within the optimum angular range.

The clamping of the clamping member to the end of the lever may be realized by the use of a slotted bore which is pressed together transversely to the slot with the aid of a clamping screw to thereby axially fix the clamping member in any desired longitudinal position on the lever. This, however, requires a through bore as well as a threaded bore in the clamping member transversely to the slot. Moreover, it requires the insertion and tightening of a screw, thereby involving certain manufacturing-, material- and assembly-expenditures. Additionally, during the tightening of the clamping screw, the clamping member due to inattention may be displaced on the lever during the assembly of the clamping device.

Consequently, the present invention also proposes a particular construction of the clamping member according to which the clamping member is more simple in manufacture and can be installed more rapidly.

This task is solved according to the present invention in that the clamping member includes a clamping spring immovably secured thereon, which consists essentially of two tongue-like leaf spring legs elastically spreading away from one another, with its plane of extension arranged respectively parallel to the pivot axis of the nearest film hinge, which legs each include a bore surrounding the end of the lever and are adapted to be clamped fast on the lever by a canting of the bore. The clamping spring used for the present invention involves a mass-production part which can be manufactured in an inexpensive manner and which can be connected with the clamping member by a simple riveting operation. By merely manually pressing together the legs, the clamping spring can be slipped over the lever and the lever can be automatically clamped in any desired position by merely releasing the spring legs. Consequently, the assembly of this type of clamping member becomes particularly simple and can be undertaken particularly rapidly.

Accordingly, it is an object of the present invention to provide a multipartite drive pedal of plastic material which avoids by simple means the aforementioned shortcomings and drawbacks encountered in the prior art.

Another object of the present invention resides in a multipartite drive pedal of plastic material which combines the advantages of the prior art drive pedal of this type with the feature of an easy compensation for relatively larger structural tolerances.

A still further object of the present invention resides in a multipartite drive pedal of synthetic plastic material which enables a compensation of larger manufacturing tolerances at the drive pedal and/or the lever by extremely simple means.

Another object of the present invention resides in a drive pedal of the type described above which enables a favorable construction of the drive pedal from a manufacturing point of view while enabling compensation of larger manufacturing tolerances in the relative position between the drive pedal and the gas linkage lever without any difficulties.

A further object of the present invention resides in a drive pedal of the type described above in which the pivotal connection between the lever and the drive pedal can be made in all installed conditions in such a manner that an operation within the optimum angular range is possible.

Still another object of the present invention resides in a multipartite drive pedal of synthetic resinous material which greatly simplifies the manufacture and in particular the assembly thereof while entailing certain material as well as manufacturing savings.

A further object of the present invention resides in a multipartite drive pedal of plastic material of the type described above which minimizes the danger of unintentional displacement during the assembly due to improper care or lack of proper attention.

Still a further object of the present invention resides in a multipartite drive pedal of the type described above which utilizes parts that can be manufactured by simple mass-production techniques while permitting an assembly that is as simple and rapid as can be expected.

These and other objects, features and advantages of the present invention will become more apparent from the following description when taken in connection with the accompanying drawing which shows, for purposes of illustration only, several embodiments in accordance with the present invention, and wherein:

FIG. 1 is a side elevational view of the arrangement of a drive pedal in accordance with the present invention within the leg space of a motor vehicle;

FIGS. 2 and 3 are partial side elevational views of two further embodiments of the pivotal coupling of the lever to the drive pedal in accordance with the present invention;

FIG. 6 is a side elevational view of still a further embodiment of the arrangement of a drive pedal in accordance with the present invention within the leg space of a motor vehicle;

FIG. 7 is a side elevational view, partly in cross section, and illustrating certain details of the drive pedal according to FIG. 6;

FIG. 8 is a cross-sectional view of the drive pedal arrangement of FIG. 6, taken along line VIII—VIII of FIG. 7; and FIGS. 9 and 10 are two elevational views, taken at right angle to each other of the clamping spring by itself as used in the arrangement according to FIGS. 6 through 8.

Figure 4:
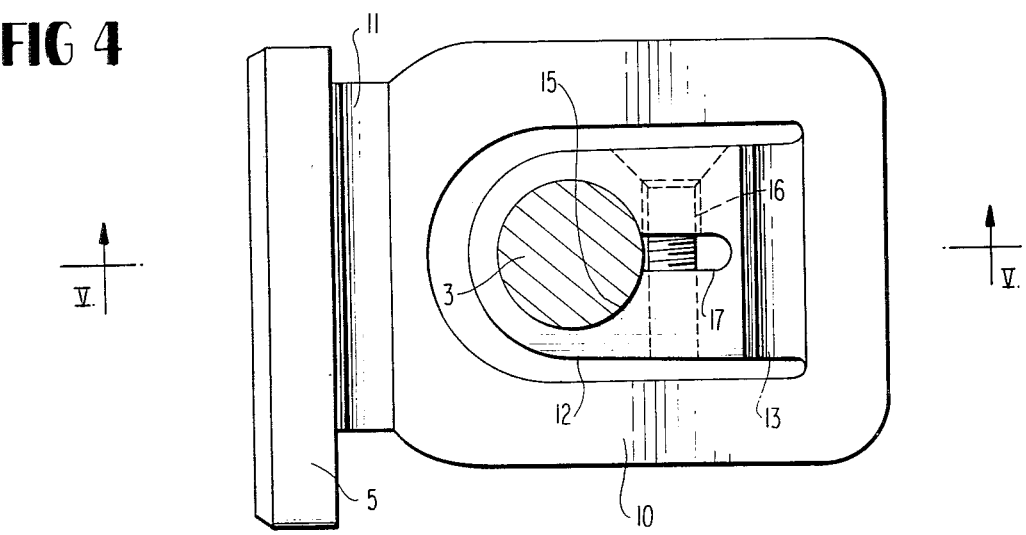
FIG. 4 is a cross-sectional view, on an enlarged scale, taken along line IV—IV of FIG. 1.
Figure 5:
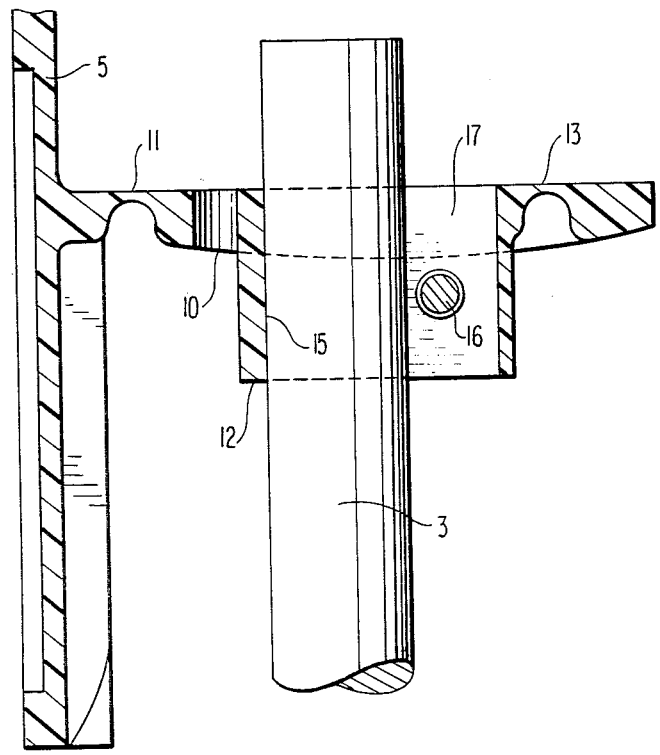
FIG. 5 is a cross-sectional view taken along line V—V of FIG. 4.

Referring now to the drawing wherein like reference numerals are used throughout the various views to designate like parts, in the leg space formed by the floor 1 of the vehicle and the so-called fire wall or dashboard 2, are arranged, among others, the drive pedal generally designated by reference numeral 5 and a lever 3 pivotal about the point of rotation 4 and hanging into the leg space, which lever 3 is form-lockingly but pivotally coupled to the drive pedal 5.

The drive pedal 5 consists of synthetic plastic material and is constructed of several members, whereby the individual members of the drive pedal are pivotally connected with each other by way of material-integrated film hinges. The essential part of the drive pedal 5 is the foot plate 6, at the lower end of which is supported a fastening part by way of a film hinge 9. The fastening part can be mounted over the mounting bracket 8 welded to the floor 1 and secured thereto by means of a cross screw or by any other known fastening means. Within the area of the upper end of the foot plate 6, an intermediate member 10 (FIGS. 1 and 2) or 10a (FIG. 3) is pivotally coupled to the back side thereof by way of a second film hinge 11. A further member, namely, the clamping member 12 is pivotally connected to the intermediate member 10, respectively, 10a in its turn by way of a third film hinge 13. A bore 15 extending transversely to the hinges 11 and 13 and in the longitudinal direction of the pedal 5 is provided in the clamping member 12, into which the rectilinearly extending end of the lever 3 can be inserted and clamped fast. For that purpose, a clamping slot 17 is provided radially to the bore axis and a clamping screw 16 transversely to the slot 17.

By reason of this arrangement, also larger manufacturing tolerances can be compensated for because the clamping member 12 can be fastened in any desired axial position of the lever 3. The intermediate member 10, respectively, 10a, and the clamping member 12 may therefore operate in each individual vehicle, i.e., with different spacings of the mounting bracket 8 with respect to the point of rotation 4 of the lever 3 in the optimum relative angular position to one another. This means the compensation of manufacturing tolerances no longer needs to take place by way of the movability of the individual members of the multi-member drive pedal 5.

In the embodiments according to FIGS. 1 and 2, the intermediate member 10 is recessed frame-like so that the clamping member 12 can be accommodated on the inside of this recess or aperture. The film hinge 13 between the clamping member 12 and the intermediate member 10 has therefore a larger distance from the foot plate 6 than the bore 15 or the clamping member 12. In the embodiment according to FIG. 3, the intermediate member 10a is relatively short and the clamping member 12 extends toward the other side of the film hinge 13.

In the embodiment according to FIGS. 1 and 2, an abutment 14 for the lever 3 is provided. The function of this abutment 14, however, can also be assumed by the intermediate member 10 in connection with the modified embodiment of the intermediate member 10 illustrated in these figures, because with this modification the clamping member 12 is disposed inside of the intermediate member 10 and only one film hinge would be loaded or stressed in this manner by the abutment.

In the embodiment according to FIG. 2, the intermediate member 10, the clamping member 12, a hinge edge 18 coordinated to the intermediate member 10 as well as the two film hinges 11 and 13 are constructed as a part separate with respect to the remaining part of the drive pedal, which can be fastened subsequently to the back side of the foot plate 6. This two-partite construction of the drive pedal can have manufacturing advantages under certain circumstances insofar as the molding tool for the manufacture of the parts of this drive pedal can be constructed more simple than with a one-piece manufacture of the entire drive pedal.

In the embodiment of FIGS. 6 through 10, in which similar reference numerals are again used to designate like parts, the drive pedal 5 again consists of synthetic plastic material and is constructed of several members, whereby the individual members of the drive pedal 5 are pivotally connected with each other by way of material-integrated film hinges. The foot plate 6 is again connected with the bracket 8 by way of the fastening part 7, itself connected with the foot plate 6 by way of the film hinge 9. A cross screw or other securing means may again be utilized to securely mount the fastening part 7 over the bracket 8. Within the area of the upper end of the foot plate 6, an intermediate member 10b is pivotally connected to the back side of the foot plate 6 by way of a second film hinge 11. A further member, namely, the clamping member 12' is pivotally connected in its turn to the intermediate member 10b by way of a third film hinge 13. A clamping spring 24 is riveted to this clamping member 12', which is adapted to be clamped fast in any desired longitudinal position onto the end of the lever 3.

The clamping spring 24 essentially consists of two leaf spring legs 26 arranged V-shaped to one another, which are connected U-shaped with one another at the leg base by way of a narrow intermediate web 27. Securing lugs 28 are arranged at the end faces of the intermediate web 27, which are placed at right angle between the leaf spring legs 26. The clamping spring 24 is immovably fastened at the clamping member 12' by means of these fastening lugs 28 and a fastening rivet 29 extending parallel to the film hinge 13.

Bores 25 are provided in the leaf spring legs 26 as close as possible to the intermediate web 27, which are slightly larger than the diameter of the lever 3. Additionally, the leaf spring legs 26 are extended beyond the bores 25 by a distance corresponding approximately to the bore diameter. This extension 30 offers the possibility to press together substantially parallel the leg ends either manually or by means of an auxiliary tool.

The operation of the clamping spring 24 is now as follows:

By pressing together the leaf spring legs 26, the two bores 25, respectively, the axes thereof are brought into a common line of alignment so that the clamping spring can be slipped over the lever end. In the desired relative position of the clamping member 12'/24, on the one hand, and the lever 3, on the other, one will release the leaf spring legs 26 so as to spring outwardly. The bore edges thereby cant on the lever 3 and hold the clamping spring 24 axially fast on the lever safe against slippage or sliding movement. For purposes of adjusting the axial relative position, the extensions 30 only have to be compressed, whereby the clamping action is again lifted. In the new desired position, the clamping spring can again be released and can thereby again become automatically clamped fast.

The advantages of this construction are an inexpensive manufacture, a far-reachingly mechanizable preassembly of the drive pedal, and a very rapid assembly possibility of the connection of the drive pedal with the lever 3. Furthermore, subsequent re-adjustments are possible very rapidly.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A multipartite drive pedal arrangement of synthetic plastic material for a vehicle comprising a foot plate connected to fastening members by flexible film hinges, a first of said fastening members being located at a lower end of the foot plate and secured to a wall portion of the vehicle, and a second of the fastening members being located at an upper rear side portion of the foot plate and secured to a pivotally mounted lever within a leg space of a passenger compartment of the vehicle, said second fastening member having a bore extending therethrough in a direction extending approximately transversely to a direction corresponding to a line about which the hinge between the second fastening member and foot plate flexes, and clamping means for fixing said second fastening member at a plurality of axially spaced positions along a linear end portion of the lever, said clamping means being connected to said second fastening means by a further flexible film hinge.

2. A drive pedal arrangement according to claim 1, characterized in that the foot plate is completely formlockingly pivotally connected with the lever by way of said second fastening member.

3. A drive pedal arrangement according to claim 1 or 2, characterized in that a part of the film hinge between the second fastening member and the foot plate faces the foot plate and is constructed as hinge edge made in one piece only with the second fastening member and clamping means and separate from the foot plate, the hinge edge being secured at the back side of the foot plate.

4. A drive pedal arrangement according to claim 3, characterized in that the film hinge provided between the second fastening member and the clamping means has a larger distance from the foot plate than the clamping means or the bore itself, and in that the clamping means is arranged on the inside of the second fastening member which is apertured frame-like.

5. A drive pedal arrangement according to claim 4, characterized in that a symmetrical aperture for receiving a clamping screw is provided tangentially to the bore and a slot is arranged in the clamping member transversely to the aperture.

6. A drive pedal arrangement according to claim 1 or 2, characterized in that the film hinge provided between the second fastening member and the clamping means has a larger distance from the foot plate than the clamping means or the bore itself, and in that the clamping member is arranged on the inside of the fastening member which is apertures frame-like.

7. A drive pedal arrangement according to claim 1 or 2, characterized in that a symmetrical aperture for receiving a clamping screw is provided tangentially to the bore and a slot is arranged in the clamping means transversely to the aperture.

8. A drive pedal arrangement according to claim 1 or 2, characterized in that the clamping means includes a clamping spring means immovably secured thereto, which has two tongue-like leaf spring elastically spreading away from one another and having a plane arranged each essentially parallel to the pivot axis of the nearest film hinge means, the leaf spring legs being each provided with a bore surrounding the end of the lever and being operable to be clamped fast on the lever by canting of the bore.

9. A drive pedal arrangement according to claim 8, characterized in that the leaf spring legs are arranged V-shaped to one another, are connected with each other at a U-shaped leg base by way of an intermediate web extending essentially transversely to the legs, in that fastening lugs are formed-on at the end faces of the intermediate web which are placed substantially at right angle to the intermediate web between the leaf spring legs, and in that the clamping spring means is secured at the clamping means by means of the fastening lugs, the leaf spring legs extending from the leg base of the V-shaped clamping spring means toward the further film hinge means between the clamping means and the second fastening member.

10. A drive pedal arrangement according to claim 9, characterized in that the leaf spring legs extend beyond the bore by approximately the bore diameter in order to enable the leaf spring legs to be manually compressed.

11. A drive pedal according to claim 10, characterized in that the bore in the leaf spring legs is placed as close as possible to the leg base formed by the intermediate web.

12. A drive pedal according to claim 8, characterized in that the leaf spring legs are extended beyond the bore by approximately the bore diameter in order to enable the leaf spring legs to be manually compressed.

13. A drive pedal arrangement according to claim 8, characterized in that the bore in the leaf spring legs is placed as close as possible to the leg base formed by the intermediate web.

* * * * *